(12) United States Patent      (10) Patent No.:   US 12,632,365 B2

Bo et al.      (45) Date of Patent:     May 19, 2026

(54) METHOD AND SYSTEM FOR BUG LOCALIZATION BASED ON CODE KNOWLEDGE GRAPH

(71) Applicant: YANGZHOU UNIVERSITY, Jiangsu (CN)

(72) Inventors: Lili Bo, Jiangsu (CN); Zhiwei Zhao, Jiangsu (CN); Xiaobing Sun, Jiangsu (CN); Yuting He, Jiangsu (CN); Xiaoxue Wu, Jiangsu (CN); Bin Li, Jiangsu (CN)

(73) Assignee: YANGZHOU UNIVERSITY, Jiangsu (CN)

( * ) Notice: Subject to any disclaimer, the term of this patent is extended or adjusted under 35 U.S.C. 154(b) by 336 days.

(21) Appl. No.: 18/473,154

(22) Filed: Sep. 22, 2023

(65) Prior Publication Data

US 2024/0111658 A1      Apr. 4, 2024

(30) Foreign Application Priority Data

Sep. 28, 2022    (CN) .......................... 202211190016.4

(51) Int. Cl.
    *G06F 8/40*        (2018.01)
    *G06F 8/41*        (2018.01)
           (Continued)

(52) U.S. Cl.
    CPC .......... *G06F 11/3624* (2013.01); *G06F 8/427* (2013.01); *G06F 11/3604* (2013.01); *G06F 40/295* (2020.01)

(58) Field of Classification Search
    CPC ........ G06F 8/42; G06F 8/427; G06F 11/3604; G06F 11/3624; G06F 40/295; G06F 40/30; Y02P 90/30
    See application file for complete search history.

(56) References Cited

U.S. PATENT DOCUMENTS

2021/0056211 A1*   2/2021   Olson ...................... G06N 5/01
2022/0067538 A1*   3/2022   Choudhary ............. G06F 8/433
                    (Continued)

OTHER PUBLICATIONS

J. Zhang et al., "Exploiting Code Knowledge Graph for Bug Localization via Bi-directional Attention," 2020 IEEE/ACM 28th International Conference on Program Comprehension (ICPC), Seoul, Korea, Republic of, 2020, pp. 219-229 (Year: 2020).*

*Primary Examiner* — Hanh Thi-Minh Bui

(74) *Attorney, Agent, or Firm* — JCIPRNET

(57)          ABSTRACT

Disclosed are a method and a system for bug localization based on a code knowledge graph, including the steps of: extracting source codes from a Git version control system, parsing in the source codes to generate an abstract syntax tree (AST), constructing a code knowledge graph, preprocessing the summary and description of a bug report crawled from a Bugzilla bug tracking system, and performing the named entity recognition to identify bug-related entity sequence, converting the code knowledge graph and the bug-related entity sequence into vector representation through an embedding algorithm, calculating cosine similarities of vector representations between the code knowledge graph and the bug entity sequence, ranking the similarities from high to low to generate a list of suspicious methods, filtering redundant information in the source codes, identifying bug-related entity elements in the bug report, and reserving the bug-related information.

10 Claims, 5 Drawing Sheets

(51) Int. Cl.
    *G06F 11/3604*       (2025.01)
    *G06F 11/362*       (2025.01)
    *G06F 40/295*       (2020.01)

(56)               References Cited

U.S. PATENT DOCUMENTS

2022/0114076 A1\*    4/2022   Zhou ........................ G06N 3/09
2023/0035121 A1\*    2/2023   Wei .......................... G06F 8/427

\* cited by examiner

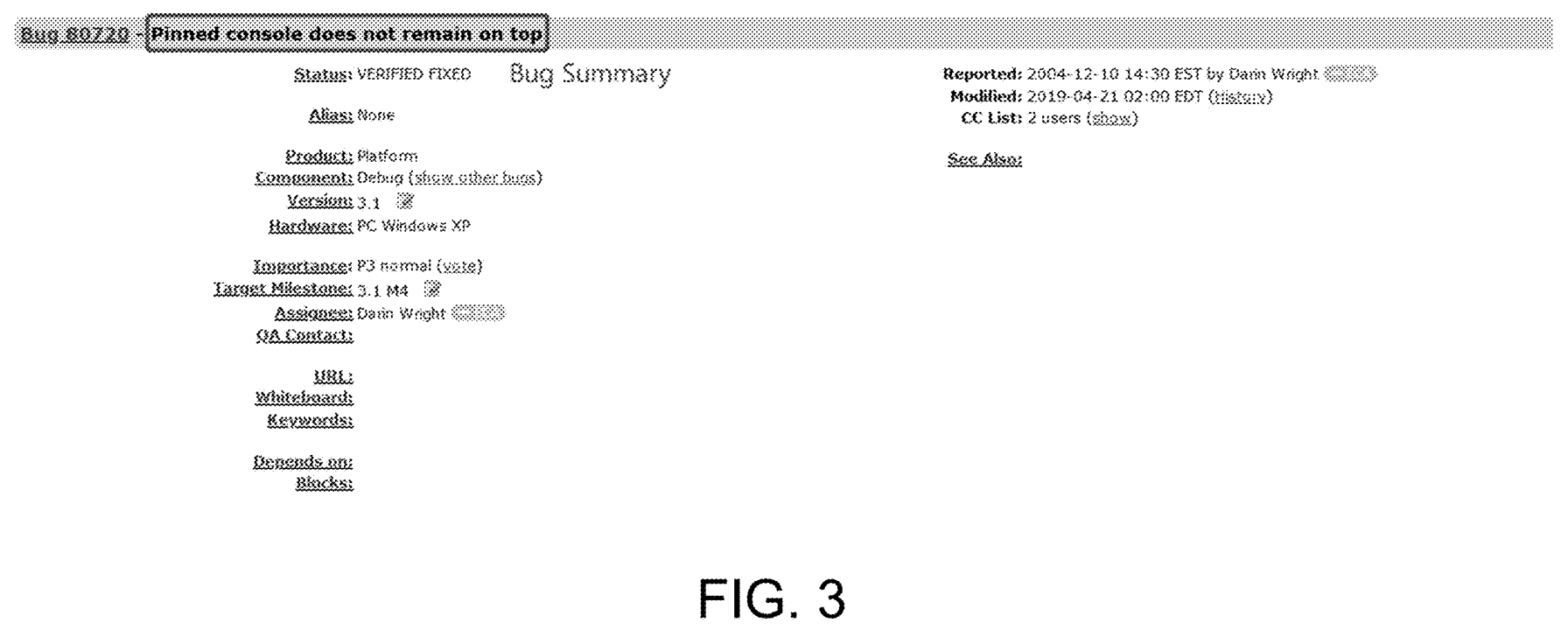

Bug 80730 - Pinned console does not remain on top

Status: VERIFIED FIXED     Bug Summary

Alias None

Product: Platform
Component: Debug (show other bugs)
Version: 3.1
Hardware: PC Windows XP Importance: P3 normal (vote)
Target Milestone: 3.1 M4
Assignee: Darin Wright
QA Contact:

URL:
Whiteboard:
Keywords:

Depends on:
Blocks:

Reported: 2004-12-10 14:30 EST by Darin Wright
Modified: 2019-04-21 02:00 EDT (History)
CC List: 2 users (show)

See Also:

FIG. 3

Description

Bug description

Darin Wright    2004-12-10 14:30:15 EST

```
* Open two console views
* Turn off the option to remove terminated launches
* Launch one program that produces output
* Pin one console
* Launch another program that produces output
* Both consoles display the last launch
^ The pinned console should remain pinned.
```

FIG. 4

METHOD AND SYSTEM FOR BUG LOCALIZATION BASED ON CODE KNOWLEDGE GRAPH

CROSS-REFERENCE TO RELATED APPLICATION

This application claims the priority benefit of Chinese patent application no. 202211190016.4, filed on Sep. 28, 2022. The entirety of the above-mentioned patent application is hereby incorporated by reference herein and made a part of this specification.

TECHNICAL FIELD

The present disclosure relates to the field of software maintenance, in particular to a method and a system for bug localization based on a code knowledge graph.

BACKGROUND

As software systems have an increasingly large scale, and become more and more complex in operation, it is difficult to identify every software bug prior to formal release due to limited software testing resources. As a result, released software systems often contain bugs.

In order to efficiently identify and repair bugs in a released software system, a bug report is prepared in natural language to describe problems that software fails to run as expected or fails to meet technical requirements of a system, and the bug report is a collection of phenomena and recurring steps that describe software bugs.

Bugs in a software system may cause serious losses. More than one third of the cost related to software development is used for localizing and repairing bugs, therefore, automatic bug localization can significantly reduce the time spent by development testers and reduce the cost of software construction and maintenance. At present, some researchers localize bugs by using information retrieval (IR) technology, which treats bug reports as queries and source files as documents, and ranks source files that may contain bugs by calculating similarities between queries and documents. Traditional IR-based bug localization suffers from the problem of mismatch between bug report text and source code file word text.

SUMMARY

An objective of the present disclosure: the present disclosure aims to provide a method and a system for bug localization based on a code knowledge graph, which is used for improving the traditional bug localization effect and improving the efficiency of bug localization.

Technical solution: the present disclosure provides a method for bug localization based on a code knowledge graph, including the following steps:

step 1: extracting source codes of AspectJ, SWT and Zxing from a Git version control system;

step 2: parsing in the source codes through a code parser to generate an abstract syntax tree (AST) of the source codes;

step 3: extracting entities and relationships from the AST to build a code knowledge graph;

step 4: crawling a bug report from an open-source Bugzilla bug tracking system, and obtaining the summary and description of the bug report;

step 5: preprocessing the summary and description of the bug report through an NLTK toolkit to obtain a bug report data set;

step 6: performing named entity recognition on the bug report data set, and extracting a bug report entity sequence;

step 7: performing vector representation on the bug report entity sequence and the code knowledge graph jointly through Word2Vec and the knowledge graph embedding algorithm; and step 8: mapping the vector representation on the bug report entity sequence and the code knowledge graph to the same vector space, calculating cosine similarities between vector representation of the bug report entity sequence and vector representation of the source file code knowledge graph, and ranking the similarities from high to low to generate a list of suspicious methods.

Further, in the step 2, the source codes are parsed into an AST by using the Spoon source code parser, a control flow is moved from a source code package to a class contained in the package, and then to variables and methods declared in the class, each method is analyzed, and parameters, variables and comments are recorded.

Further, in the step 3, the code knowledge graph is composed of package, class, method, parameter, variable and statement as entities, and hasPackage, hasVariable, hasMethod, hasParameter, Extend, hasStatement and Call as edge types, and it is visualized through the Neo4j graph database.

Further, in the step 6, the BIO sequence labeling method is used to manually label the bug report data set, and the BiLSTM-CRF is used to perform the named entity recognition, so that bug entity sequences are extracted.

The present disclosure further provides a system for bug localization based on code knowledge graph, including a source code extraction module, a source code parsing module, a code knowledge graph construction module, a bug report crawling module, a data set construction module, a named entity recognition module, a vectorization module, and a similarity calculation module;

the source code extraction module is used for extracting source codes of AspectJ, SWT and Zxing are extracted from a Git version control system;

the source code parsing module is used for parsing in the source codes through a code parser to generate an abstract syntax tree (AST) of the source codes;

the code knowledge graph construction module is used for extracting entities and relationships from the constructed AST to construct a code knowledge graph;

the bug report crawling module is used for crawling a bug report from an open-source Bugzilla bug tracking system, and obtaining the summary and description of the bug report;

the data set construction module is used for preprocessing the summary and description of the bug report through an NLTK toolkit to obtain a bug report data set;

the named entity recognition module is used for performing named entity recognition on the bug report data set, and extracting a bug report entity sequence, including a labeling unit and an extraction sequence unit;

the vectorization module is used for performing vector representation on the bug report entity sequence and the code knowledge graph jointly through Word2Vec and the knowledge graph embedding algorithm; and the similarity calculation module is used for mapping the vector representation on the bug report entity sequence and the code knowledge graph to the same vector space, calculating cosine similarities between vector representation of the bug report entity sequence and vector representation of the source file code knowledge graph, and ranking the similarities from high to low to generate a list of suspicious methods.

Further, in the source code parsing module, the source codes are parsed into an AST by using the Spoon source code parser, a control flow is moved from a source code package to a class contained in the package, and then to variables and methods declared in the class, each method is analyzed, and parameters, variables and comments are recorded.

Further, in the code knowledge graph construction module, the code knowledge graph is composed of package, class, method, parameter, variable and statement as entities, and hasPackage, hasVariable, hasMethod, hasParameter, Extend, hasStatement and Call as edge types, and it is visualized through the Neo4j graph database.

Further, in the named entity recognition module, the BIO sequence labeling method is used to manually label the bug report data set, and the BiLSTM-CRF is used to perform the named entity recognition, so that bug entity sequences are extracted.

Beneficial effects: compared with the prior art, the present disclosure has the following remarkable advantages: by constructing the code knowledge graph, the method can make full use of the structural information and the relationship information of the source codes to localize the bugs, and can filter redundant information in the source codes; and by observing the bug report, the method can be used for identifying bug-related entity elements in the bug report, performing the named entity recognition through the BiLSTM+CRF model, reserving the bug-related information, removing useless words, and improving the accuracy of bug localization.

BRIEF DESCRIPTION OF THE DRAWINGS

FIG. 3 is a screenshot of a bug report summary part of Bugzilla in the present disclosure;

FIG. 4 is a screenshot of a bug report description part of Bugzilla in the present disclosure.

DETAILED DESCRIPTIONS OF THE EMBODIMENTS

The present disclosure will be further described in detail below with reference to accompanying drawings and in conjunction with specific embodiments.

Embodiment 1

Figure 1:
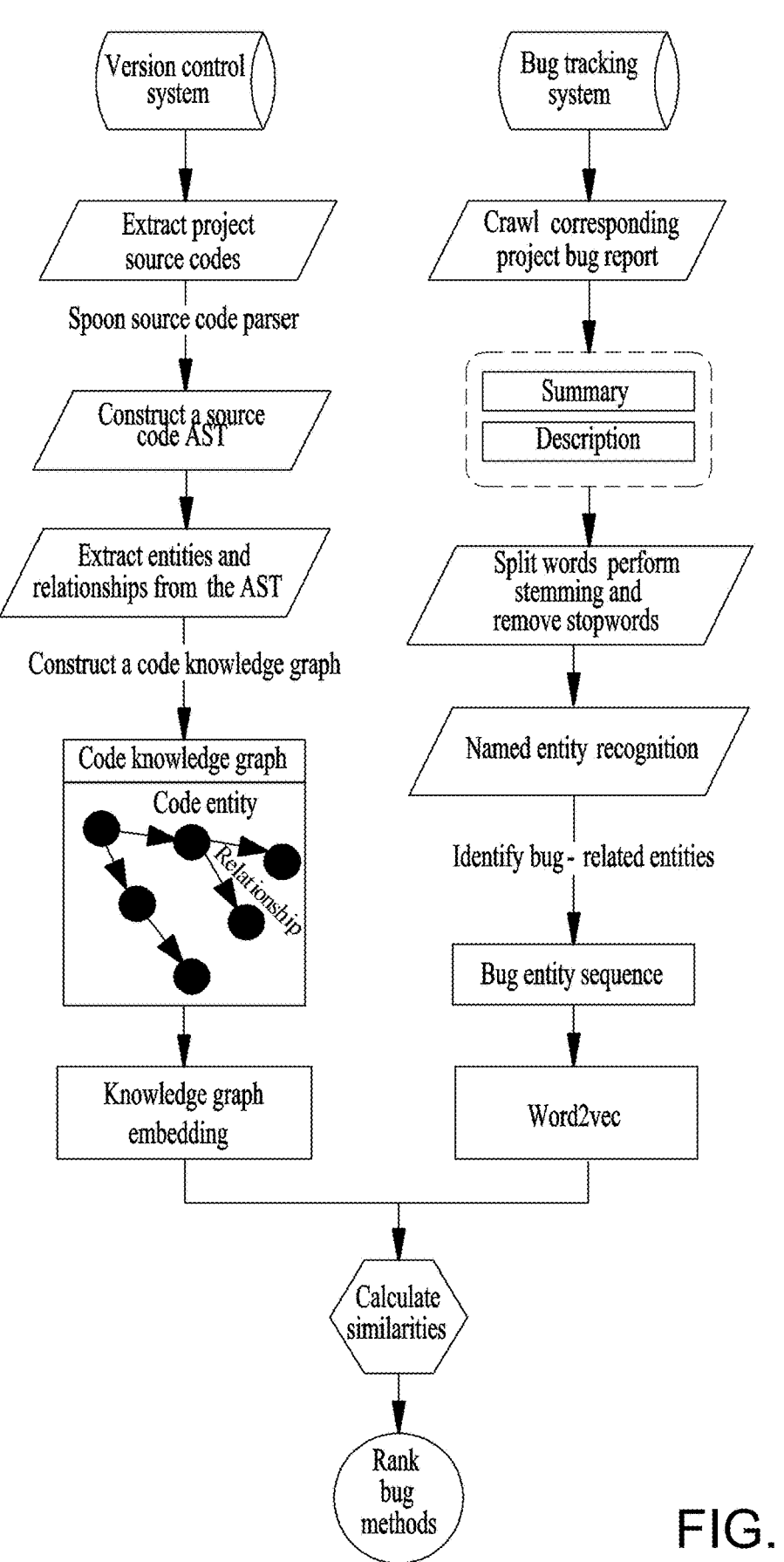
FIG. 1 is a schematic flow diagram of the present disclosure.

The present disclosure provides a method for bug localization based on a code knowledge graph, as shown in FIG. 1, including the following steps:

Step 1: extracting source codes of AspectJ, SWT and Zxing from a Git version control system.

Step 2: parsing in the source codes through a code parser to generate an abstract syntax tree (AST) of the source codes.

The source codes are parsed into an AST by using the Spoon source code parser, a control flow is moved from a source code package to a class contained in the package, and then to variables and methods declared in the class, each method is analyzed, and parameters, variables and comments are recorded.

Step 3: extracting entities and relationships from the AST to construct a code knowledge graph.

Figure 2:
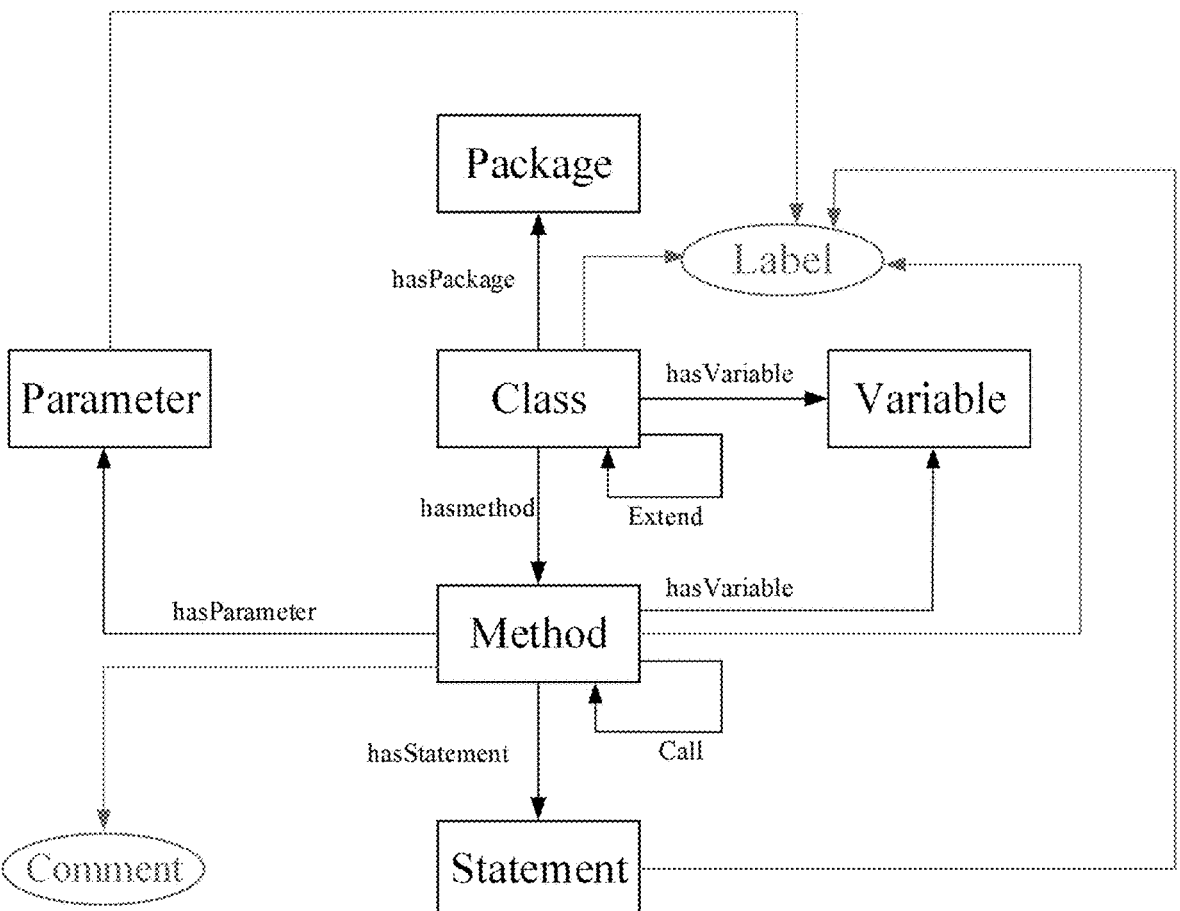
FIG. 2 is a schematic diagram of code-only picture Schema in the present disclosure.

Step 3-1: with reference to FIG. 2, extracting a package name from the AST, obtaining types, such as classes and interfaces, contained in the package through the control flow, obtaining methods and variables contained in a class statement, and then parameters, variables, and the like, contained in each method are declared to the class, and then generating triples.

Step 3-2: storing the triples in RDF format, and using a Neo4j graph database to visually view the code knowledge graph, and the entity-relationship types of the knowledge graph are shown in Tables 3-1 and 3-2.

TABLE 3-1

Entity Type Table of the Code Knowledge Graph

| Entity Type | Related Description |
|---|---|
| Package | A class library unit, a package containing a set of classes |
| Class | A class that contains member variables, methods, and code blocks. |
| Method | A method, present in a class, is a set of codes that organizes code blocks with independent functions into a whole to make them have special functions. |
| Parameter | A parameter is a variable in the Java programming language located within method and constructor declarations, and is used to provide additional information for methods and constructors. |
| Variable | Class variables and local variables in methods. |
| Statement | A statement in a method body. |

TABLE 3-2

Relationship Type Table of the Code Knowledge Graph

| Relationship Type | Related Description |
|---|---|
| hasPackage | Between Class and Package entity types |
| hasMethod | Between Method and Class entity types |
| hasVariable | Between Method and Variable entity types |
| | Between Class and Variable entity types |
| Extend | Inheritance relationship between Class and Class |
| hasParameter | Between Method and Parameter entity types |
| Call | Call relationship between Method and Method |
| hasStatement | Relationship between Method and Statement |

The code knowledge graph is composed of package, class, method, parameter, variable and statement as entities, and hasPackage, hasVariable, hasMethod, hasParameter, Extend, hasStatement and Call as edge types, and it is visualized through the Neo4j graph database.

Step 4: crawling a bug report from an open-source Bugzilla bug tracking system, and obtaining the summary and description of the bug report.

Step 5: preprocessing the summary and description of the bug report through an NLTK toolkit to obtain a bug report data set.

With reference to FIGS. 3-4, the bug report includes identifier names, that is, a bug summary part and a bug description part, which are the information helpful for bug localization. The bug report is first preprocessed by removing stopwords, performing steaming, etc., and a composite Token using CamelCase notation is split, for example, "commonviewer" is split into "common" and "viewer".

The stem of token is extracted by the Porter stemming algorithm, and "common" and "viewer" are stemmed into "common" and "view", respectively.

Step 6: performing named entity recognition on the bug report data set, and extracting a bug report entity sequence.

Step 6-1: using the BIO sequence labeling method to manually label the bug report data set and label bug-related entities.

Figure 5:
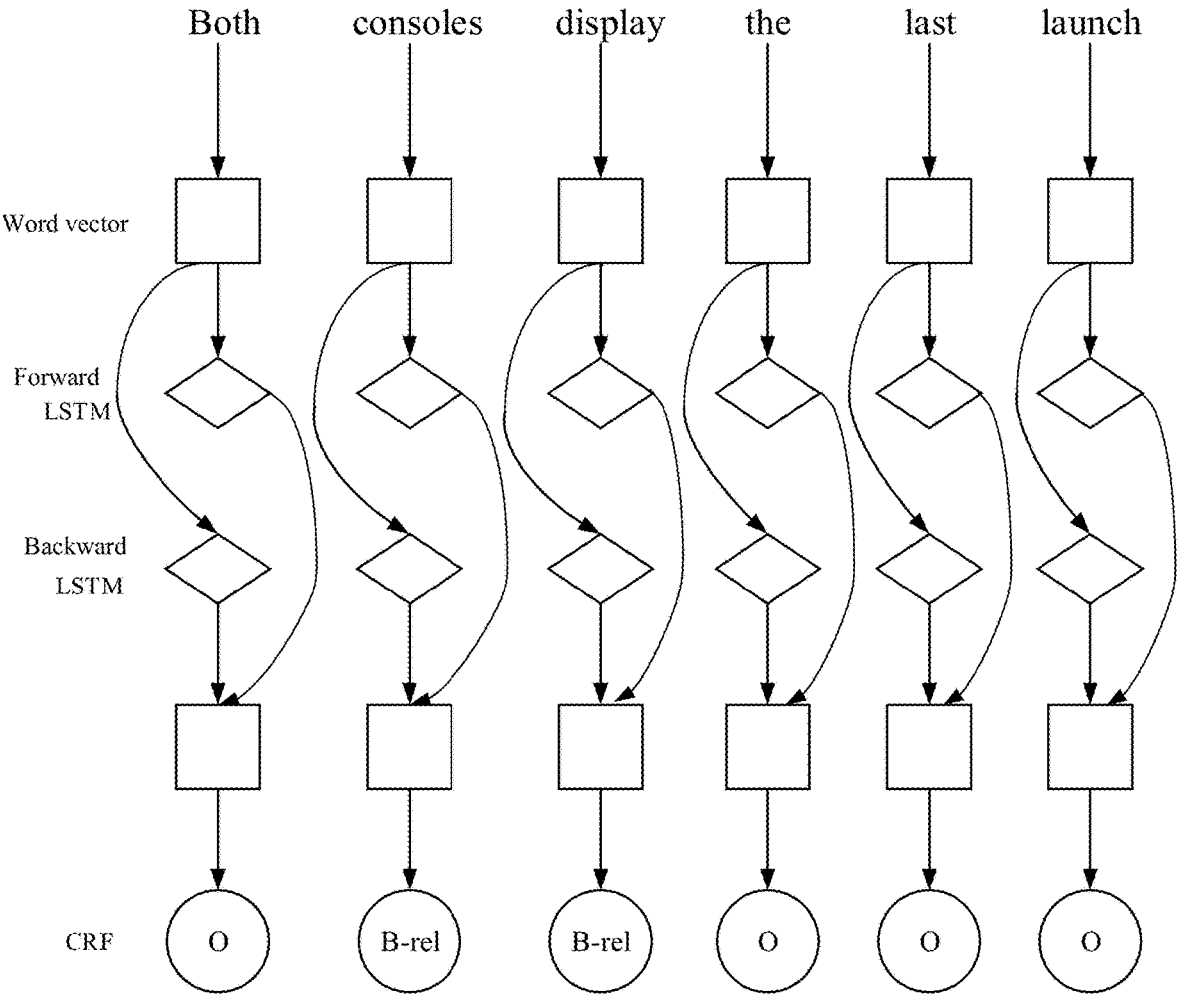
FIG. 5 is a schematic diagram of a BiLSTM+CRF model of the present disclosure.

Step 6-2: with reference to FIG. 5, training a BiLSTM-CRF model, performing the sequence labeling, and extracting the bug report entity sequence.

Step 7: performing vector representation on the bug report entity sequence and the code knowledge graph jointly through Word2Vec and the knowledge graph embedding algorithm.

The entity sequence extracted from the bug report and a code knowledge graph are subject to the vector representation; where the structural information in the code knowledge graph refers to information such as Class and Method, the relationship information refers to inheritance relationship between classes, and call relationship between methods, and the like, and bug-related files are mined more deeply through the information, so that the accuracy of bug localization is improved, and the time and energy costs of code maintenance personnel are reduced.

Step 8: mapping the vector representation on the bug report entity sequence and the code knowledge graph to the same vector space, and calculating cosine similarities between vector representation of the bug report entity sequence and vector representation of the source file code knowledge graph, the calculation formula of cosine similarities cos(br_k, m_i) is shown as follows, where br_k* is the vector representation of the bug report entity sequence, and m_i* is the vector representation of the source file code knowledge graph.

$$\cos(br_k, m_i) = \frac{br_k^* \cdot m_i^*}{|br_k^*| \times |m_i^*|}$$

The cosine similarities between vector representations are ranked from high to low to generate a list of suspicious methods, the code method element with the highest cosine similarity is the most suspicious bug method, and the bug report and the corresponding list of suspicious bug methods are shown in Table 8-1.

TABLE 8-1

Summary and Description of Bug Report and
Corresponding List of Suspicious Bug Method

| Summary and description of the bug report | Suscipious bug method |
|---|---|
| Summary:CLabel disappears when given SWT.CENTER flagin constructor Description: Not working (CLabel disappears):Clabellabel= newCLabel(composite,SWT.SHADOW__IN\|SWT.CE NTER);label.setLayoutData(newGridData(GridData.F ILL__HORIZONTAL));Workaround:CLabel label = new CLabel(composite, SWT.SHADOW__IN); label.setAlignment(SWT.CENTER);label.setLayoutD ata(newGridData(GridData.FILL__HORIZONTAL)); Noticed this on Linux (gtk) , Eclipse 3.1M4 | Org.eclipse.swt.custom.CLabel.CL abel(Composite parent, int style) Org.eclipse.swt.custom.CLabel.che ckStyle( ) Org.eclipse.swt.custom.CLabel.get Style( ) |

Embodiment 2

Corresponding to the bug localization method based on code knowledge graph, this embodiment provides a system for bug localization based on code knowledge graph, as shown in FIG. 1, the system includes a source code extraction module, a source code parsing module, a code knowledge graph construction module, a bug report crawling module, a data set construction module, a named entity recognition module, a vectorization module, and a similarity calculation module.

The source code extraction module is used for extracting source codes of AspectJ, SWT and Zxing are extracted from a Git version control system.

The source code parsing module is used for parsing in the source codes through a code parser to generate an abstract syntax tree (AST) of the source codes.

The source codes are parsed into an AST by using the Spoon source code parser, a control flow is moved from a source code package to a class contained in the package, and then to variables and methods declared in the class, each method is analyzed, and parameters, variables and comments are recorded.

The code knowledge graph construction module is used for extracting entities and relationships from the constructed AST to construct a code knowledge graph, including a triple unit and a visualization unit.

The triple unit is used for extracting a package name from the AST, obtaining types, such as classes and interfaces, contained in the package through the control flow, obtaining methods and variables contained in a class statement, and then parameters, variables, and the like, contained in each method are declared to the class, and then generating triples, as shown in FIG. 2.

The visualization unit is used for storing the triples in RDF format, and using an Neo4j graph database to visually view the code knowledge graph, and the entity-relationship types of the knowledge graph are shown in Tables 3-1 and 3-2.

TABLE 3-1

Entity Type Table of the Code Knowledge Graph

| Entity Type | Relevant Notes: |
|---|---|
| Package | A class library unit, a package containing a set of classes |
| Class | A class that contains member variables, methods, and code blocks. |

TABLE 3-1-continued

Entity Type Table of the Code Knowledge Graph

| Entity Type | Relevant Notes: |
|---|---|
| Method | A method, present in a class, is a set of codes that organizes code blocks with independent functions into a whole to make them have special functions. |
| Parameter | A parameter is a variable in the Java programming language located within method and constructor declarations, and is used to provide additional information for methods and constructors. |
| Variable | Class variables and local variables in methods. |
| Statement | A statement in a method body. |

TABLE 3-2

Relationship Type Table of the Code Knowledge Graph

| Relationship Code | Relevant Notes: |
|---|---|
| hasPackage | Between Class and Package entity types |
| hasMethod | Between Method and Class entity types |
| hasVariable | Between Method and Variable entity types |
| | Between Class and Variable entity types |
| Extend | Inheritance relationship between Class and Class |
| hasParameter | Between Method and Parameter entity types |
| Call | Call relationship between Method and Method |
| hasStatement | Relationship between Method and Statement |

The code knowledge graph is composed of package, class, method, parameter, variable and statement as entities, and hasPackage, hasVariable, hasMethod, hasParameter, Extend, hasStatement and Call as edge types, and it is visualized through the Neo4j graph database.

The bug report crawling module is used for crawling a bug report from an open-source Bugzilla bug tracking system, and obtaining the summary and description of the bug report.

The data set construction module is used for preprocessing the summary and description of the bug report through an NLTK toolkit to obtain a bug report data set.

With reference to FIGS. 3-4, the bug report includes identifier names, that is, a bug summary part and a bug description part, which are the information helpful for bug localization. The bug report is first preprocessed by removing stopwords, performing steaming, etc., and a composite Token using CamelCase notation is split, for example, "commonviewer" is split into "common" and "viewer".

The stem of token is extracted by the Porter stemming algorithm, and "common" and "viewer" are stemmed into "common" and "view", respectively.

The named entity recognition module is used for performing named entity recognition on the bug report data set, and extracting a bug report entity sequence, including a labeling unit and an extraction sequence unit.

The labeling unit is used for using the BIO sequence labeling method to manually label the bug report data set and label bug-related entities.

The extraction sequence unit is used for training a BiLSTM-CRF model, performing the sequence labeling, and extracting the bug report entity sequence, as shown in FIG. 5.

The vectorization module is used for performing vector representation on the bug report entity sequence and the code knowledge graph jointly through Word2Vec and the knowledge graph embedding algorithm.

The entity sequence extracted from the bug report and a code knowledge graph are subject to the vector representation; where the structural information in the code knowledge graph refers to information such as Class and Method, the relationship information refers to inheritance relationship between classes, and call relationship between methods, and the like, and bug-related files are mined more deeply through the information, so that the accuracy of bug localization is improved, and the time and energy costs of code maintenance personnel are reduced.

The similarity calculation module is used for mapping the vector representation on the bug report entity sequence and the code knowledge graph to the same vector space, and calculating cosine similarities between vector representation of the bug report entity sequence and vector representation of the source file code knowledge graph, the calculation formula of cosine similarities $\cos(br_k, m_i)$ is shown as follows, where $br_k^*$ is the vector representation of the bug report entity sequence, and $m_i^*$ is the vector representation of the source file code knowledge graph.

$$\cos(br_k, m_i) = \frac{br_k^* \cdot m_i^*}{|br_k^*| \times |m_i^*|}$$

The cosine similarities between vector representations are ranked from high to low to generate a list of suspicious methods, the code method element with the highest cosine similarity is the most suspicious bug method, and the bug report and the corresponding list of suspicious bug methods are shown in Table 8-1.

TABLE 8-1

Summary and Description of Bug Report and Corresponding List of Suspicious Bug Method

| Summary and description of the bug report | Suspicious bug method |
|---|---|
| Summary: CLabel disappears when given SWT.CENTER flagin constructor Description: Not working (CLabel disappears): Clabellabel= newCLabel(composite,SWT.SHADOW_IN\|SWT.CENTER);label.setLayoutData(newGridData(GridData.FILL_HORIZONTAL));Workaround:CLabel label = new CLabel(composite, SWT.SHADOW_IN); label.setAlignment(SWT.CENTER);label.setLayoutData(newGridData(GridData.FILL_HORIZONTAL)); Noticed this on Linux (gtk) , Eclipse 3.1M4 | Org.eclipse.swt.custom.CLabel .CLabel(Composite parent, int style) Org.eclipse.swt.custom.CLabel .checkStyle( ) Org.eclipse.swt.custom.CLabel .getStyle( ) |

What is claimed is:

1. A method for bug localization based on a code knowledge graph, comprising the following steps:

step 1: extracting source codes of AspectJ, Standard Widget Toolkit (SWT) and Zxing from a Git version control system;

step 2: parsing in the source codes through a code parser to generate an abstract syntax tree (AST) of the source codes;

step 3: extracting entities and relationships from the AST to build the code knowledge graph;

step 4: crawling a bug report from an open-source Bugzilla bug tracking system, and obtaining a summary and description of the bug report;

step 5: preprocessing the summary and description of the bug report through a Natural Language Toolkit (NLTK) toolkit to obtain a bug report data set;

step 6: performing named entity recognition on the bug report data set, and extracting a bug report entity sequence;

step 7: performing vector representation on the bug report entity sequence and the code knowledge graph jointly through Word2Vec and a knowledge graph embedding algorithm; and step 8: mapping the vector representation on the bug report entity sequence and the code knowledge graph to the same vector space, calculating cosine similarities between the vector representation of the bug report entity sequence and the vector representation of the source file code knowledge graph, and ranking the cosine similarities from high to low to generate a list of suspicious bug code, wherein bug-related files are mined through the list of suspicious bug code so that accuracy of bug localization is improved, wherein bugs repairing is conducted through the bug-related files so that time and energy costs are reduced.

2. The method for bug localization based on the code knowledge graph according to claim 1, wherein in the step 2, the source codes are parsed into the AST by using a Spoon source code parser, a control flow is moved from a source code package to a class contained in the source code package, and then to variables and suspicious bug code declared in the class, each suspicious bug code is analyzed, and parameters, the variables and comments are recorded.

3. The method for bug localization based on the code knowledge graph according to claim 1, wherein in the step 3, the code knowledge graph is composed of package, class, method, parameter, variable and statement as entities, and hasPackage, has Variable, hasMethod, hasParameter, Extend, hasStatement and Call as edge types, and it is visualized through a Neo4j graph database.

4. The method for bug localization based on the code knowledge graph according to claim 1, wherein in the step 6, a BIO sequence labeling suspicious bug code is used to manually label the bug report data set, and a BiLSTM-CRF is used to perform the named entity recognition, so that bug entity sequences are extracted.

5. A system for bug localization based on a code knowledge graph, comprising a processor and a memory storing instructions executable by the processor, wherein the processor is configured to execute the instructions to implement:

a source code extraction module, a source code parsing module, a code knowledge graph construction module, a bug report crawling module, a data set construction module, a named entity recognition module, a vectorization module, and a similarity calculation module;

wherein the source code extraction module is used for extracting source codes of AspectJ, Standard Widget Toolkit (SWT) and Zxing are extracted from a Git version control system;

the source code parsing module is used for parsing in the source codes through a code parser to generate an abstract syntax tree (AST) of the source codes;

the code knowledge graph construction module is used for extracting entities and relationships from the constructed AST to construct the code knowledge graph;

the bug report crawling module is used for crawling a bug report from an open-source Bugzilla bug tracking system, and obtaining a summary and description of the bug report;

the data set construction module is used for preprocessing the summary and description of the bug report through a Natural Language Toolkit (NLTK) toolkit to obtain a bug report data set;

the named entity recognition module is used for performing named entity recognition on the bug report data set, and extracting a bug report entity sequence, comprising a labeling unit and an extraction sequence unit;

the vectorization module is used for performing vector representation on the bug report entity sequence and the code knowledge graph jointly through Word2Vec and a knowledge graph embedding algorithm; and the similarity calculation module is used for mapping the vector representation on the bug report entity sequence and the code knowledge graph to the same vector space, calculating cosine similarities between the vector representation of the bug report entity sequence and the vector representation of the code knowledge graph, and ranking the cosine similarities from high to low to generate a list of suspicious bug code, wherein bug-related files are mined through the list of suspicious bug code so that accuracy of bug localization is improved, wherein bugs repairing is conducted through the bug-related files so that time and energy costs are reduced.

6. The system for bug localization based on the code knowledge graph according to claim 5, wherein in the source code parsing module, the source codes are parsed into the AST by using a Spoon source code parser, a control flow is moved from a source code package to a class contained in the source code package, and then to variables and suspicious bug code declared in the class, each suspicious bug code is analyzed, and parameters, the variables and comments are recorded.

7. The system for bug localization based on the code knowledge graph according to claim 5, wherein in the code knowledge graph construction module, the code knowledge graph is composed of package, class, method, parameter, variable and statement as entities, and hasPackage, hasVariable, hasMethod, hasParameter, Extend, hasStatement and Call as edge types, and it is visualized through a Neo4j graph database.

8. The system for bug localization based on the code knowledge graph according to claim 5, wherein in the named entity recognition module, a BIO sequence labeling suspicious bug code is used to manually label the bug report data set, and a BiLSTM-CRF is used to perform the named entity recognition, so that bug entity sequences are extracted.

9. A computer device, comprising a memory, a processor and a computer program stored on the memory and runnable on the processor, wherein the processor implements the steps of the method described in claim 1 when executing the said computer program.

10. A non-transient computer-readable storage medium having a computer program stored thereon, wherein the program, when executed by a processor, implements the steps of the method described in claim 1.

\* \* \* \* \*